No. 618,037. Patented Jan. 17, 1899.
V. JOHNSON.
SNOW OR ICE VELOCIPEDE.
(Application filed Mar. 7, 1898.)

(No Model.)

Witnesses

Inventor
V. Johnson
By his Attorney

UNITED STATES PATENT OFFICE.

VINCENT JOHNSON, OF ASPEN, COLORADO.

SNOW OR ICE VELOCIPEDE.

SPECIFICATION forming part of Letters Patent No. 618,037, dated January 17, 1899.

Application filed March 7, 1898. Serial No. 672,966. (No model.)

*To all whom it may concern:*

Be it known that I, VINCENT JOHNSON, a citizen of the United States of America, residing at Aspen, in the county of Pitkin and State of Colorado, have invented certain new and useful Improvements in Snow or Ice Velocipedes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in velocipedes especially adapted for use on snow and ice; and to this end the invention consists of the features, arrangements, and combinations hereinafter described and claimed, all of which will be fully understood by reference to the accompanying drawings, in which is illustrated an embodiment thereof.

Figure 1:
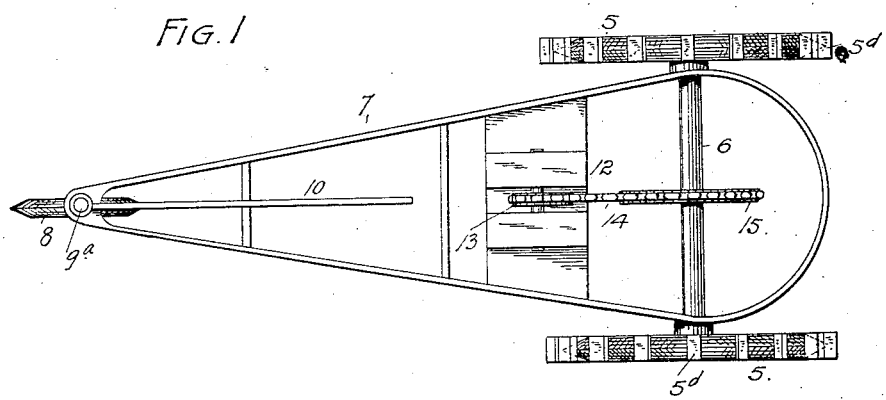
Figure 2:
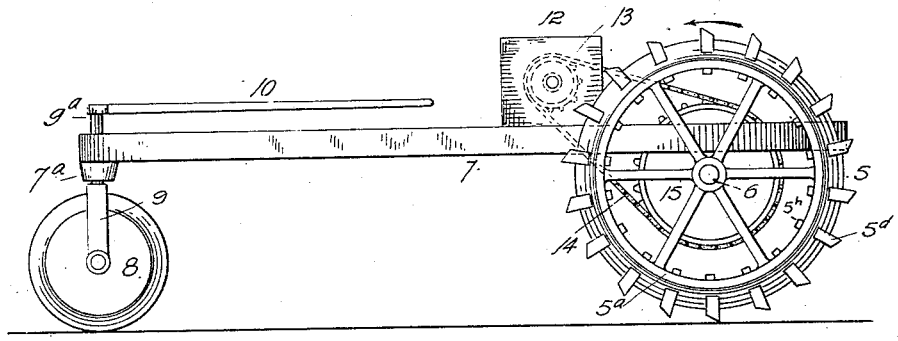
Figures 3, 4:
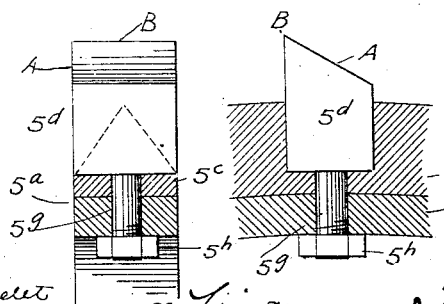

In the drawings, Figure 1 is a top or plan view of my improved machine. Fig. 2 is a side elevation of the machine. Figs. 3 and 4 are enlarged sectional views taken through the tire of the wheel and illustrating the construction of the sprockets or teeth.

Similar reference characters indicating corresponding parts in the views, let the numeral 5 designate the two rear wheels of the machine, which are made fast on a shaft or axle 6, journaled on the platform or body 7 of the machine. The front extremity of the body part 7 is supported by a wheel 8, provided with a V-shaped tire and journaled in a fork 9, provided with a central stem or steering-post $9^a$, journaled in the steering-head or front extremity $7^a$ of the body 7. To the upper extremity of this steering-post is attached a horizontal arm 10, located in convenient reach of the person in charge of the machine and to be utilized for steering purposes. Suitably mounted on the body 7, at any convenient point, is a prime motor 12 of any approved type.

It is my purpose to employ a gasolene-engine to operate the machine. From the sprocket-wheel 13 on the motor-shaft leads a chain 14 to a sprocket-wheel 15 on the shaft 6 of the rear wheels. To the fellies $5^a$ of these wheels are applied tires $5^c$, having their outer faces V-shaped, whereby they are adapted to cut through the snow readily. These tires are transversely recessed at suitable intervals and provided with apertures registering with apertures formed through the felly of the wheel. In the recesses of the tire are set the sprockets or teeth $5^d$, provided with threaded shanks or stems $5^e$, which pass through the registering apertures of the tire and felly. These sprockets are secured in place by means of nuts $5^h$, applied to the protruding extremities of the said shanks. The sprockets $5^d$ are beveled, as shown at A, forming transverse edges B, adapted to engage the surface on which the machine is traveling. When the machine is in use, the wheels 5 are rotated in the direction indicated by the arrow. (See Fig. 2.) The power is transmitted to the axle 6 from the motor 12 through the instrumentality of the sprocket-wheels 13 and 15 and their connecting-chain 14. If there is snow upon the ground, the V-shaped tires of the wheels 5, as well as the forward wheel 8, which also has the V-shaped tire, readily cut therethrough until a solid surface is reached. The engagement of the teeth $5^d$ of the wheels 5 with its surface causes the machine to travel forward. It is evident that the machine may be advantageously employed on ice, snow-covered ground, and bare ground.

When it is desired to travel upon water, the machine may be mounted upon a boat or other suitable floating structure (not shown) and fans or paddles (not shown) substituted for the teeth or sprockets $5^d$ of the wheels 5. These fans or paddles will act upon the water and propel the boat as the shaft 6 is rotated.

In using my improved machine, if traveling on snow or ice, one or more sledges for freight or passengers may be attached thereto and drawn in the rear. If the ground is bare, a train of suitable vehicles may be drawn in the rear.

It will thus be seen that my improved machine may be employed on snow, ice, bare ground, or water. Hence it will be found of great value in traveling through the so-called Klondike regions of Alaska and Canada.

Having thus described my invention, what I claim is—

1. A machine of the character described comprising a body, a shaft journaled thereon, traction-wheels fast on the shaft, V-shaped tires applied to the fellies of said wheels, said tires being transversely recessed and apertured to register with apertures in the fellies of the wheels and sprockets seated in the recesses of the tires and having threaded shanks passing through the registering apertures of the tires and fellies, the sprockets being fastened by nuts applied to their protruding threaded extremities, and a steering-wheel having a V-shaped tire upon which the front end of the machine is supported.

2. A traction-wheel having a V-shaped tire provided with recesses and sprockets seated in said recesses and fastened to the wheels, said sprockets being beveled to form edges extending transversely to the apex of the tire.

3. A traction-wheel having a V-shaped tire provided with sprockets projecting beyond the apex of the tire and beveled to form edges extending transversely to the tire-apex.

In testimony whereof I affix my signature in presence of two witnesses.

VINCENT JOHNSON.

Witnesses:
 G. J. ROLLANDET,
 A. J. O'BRIEN.